US011934311B2

(12) United States Patent
Fetterman et al.

(10) Patent No.: US 11,934,311 B2
(45) Date of Patent: Mar. 19, 2024

(54) HYBRID ALLOCATION OF DATA LINES IN A STREAMING CACHE MEMORY

(71) Applicant: NVIDIA CORPORATION, Santa Clara, CA (US)

(72) Inventors: Michael Fetterman, Lancaster, MA (US); Steven James Heinrich, Madison, AL (US); Shirish Gadre, Fremont, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1 day.

(21) Appl. No.: 17/736,557

(22) Filed: May 4, 2022

(65) Prior Publication Data

US 2023/0359560 A1 Nov. 9, 2023

(51) Int. Cl.
| | |
|---|---|
| *G06F 12/00* | (2006.01) |
| *G06F 9/38* | (2018.01) |
| *G06F 12/0811* | (2016.01) |
| *G06F 12/084* | (2016.01) |
| *G06F 12/0877* | (2016.01) |

(52) U.S. Cl.
CPC ........ *G06F 12/0811* (2013.01); *G06F 9/3816* (2013.01); *G06F 12/084* (2013.01); *G06F 12/0877* (2013.01)

(58) Field of Classification Search
CPC .. G06F 12/0811; G06F 9/3816; G06F 12/084; G06F 12/0877
See application file for complete search history.

(56) References Cited

U.S. PATENT DOCUMENTS

| | | | | |
|---|---|---|---|---|
| 8,464,001 B1* | 6/2013 | Edmondson | ........ | G06F 12/0804 711/143 |
| 2011/0078692 A1* | 3/2011 | Nickolls | ............. | G06F 9/30087 718/103 |
| 2015/0012705 A1* | 1/2015 | Holmqvist | .......... | G06F 12/0886 711/118 |
| 2015/0046662 A1* | 2/2015 | Heinrich | ............. | G06F 13/1626 711/151 |
| 2016/0118110 A1* | 4/2016 | Kim | .................... | G11C 11/5628 365/185.03 |

\* cited by examiner

*Primary Examiner* — Arvind Talukdar
(74) *Attorney, Agent, or Firm* — Artegis Law Group, LLP

(57) ABSTRACT

Various embodiments include a system for managing cache memory in a computing system. The system includes a sectored cache memory that provides a mechanism for sharing sectors in a cache line among multiple cache line allocations. Traditionally, different cache line allocations are assigned to different cache lines in the cache memory. Further, cache line allocations may not use all of the sectors of the cache line, leading to low utilization of the cache memory. With the present techniques, multiple cache lines share the same cache line, leading to improved cache memory utilization relative to prior techniques. Further, sectors of cache allocations can be assigned to reduce data bank conflicts when accessing cache memory. Reducing such data bank conflicts can result in improved memory access performance, even when cache lines are shared with multiple allocations.

21 Claims, 10 Drawing Sheets

HYBRID ALLOCATION OF DATA LINES IN A STREAMING CACHE MEMORY

BACKGROUND

Field of the Various Embodiments

Various embodiments relate generally to computer memory architectures and, more specifically, to hybrid allocation of data lines in a streaming cache memory.

Description of the Related Art

A computing system generally includes, among other things, one or more processing units, such as central processing units (CPUs) and/or graphics processing units (CPUs), and one or more memory systems. Processing units execute user mode software applications, which submit and launch compute tasks, executing on one or more compute engines included in the processing units. Processing units include a multitiered memory system to improve performance when loading data from and storing data to memory.

Multitiered memory systems include a relatively large, and relatively lower performance, system memory for storing large amounts of program instructions included in the user mode software applications along with data accessed over time by the user mode software applications during execution. Further, multitiered memory systems include a relatively small, and relatively higher performance, cache memory for storing those program instructions and data that are currently or imminently accessible to the user mode software applications. Typically, a cache memory can be organized as a set of cache lines, where each cache line includes dozens or hundreds of bytes of data. When data is loaded in the cache, a cache controller allocates one or more cache lines, and then loads data from system memory and stores the data in the cache lines. The cache controller loads the cache memory with instructions and data from system memory at the time of use or just prior to the time of use. As a result, the processing unit is able to load instructions and data from higher performance cache memory for instructions and data more often than lower performance system memory. The processing unit can also store data to higher performance cache memory. The cache controller eventually stores such cache lines to lower performance system memory. The processing unit thereby realizes improved memory performance relative to a nonhierarchical memory system with only system memory.

In general, the available memory transfer bandwidth between the system memory and the cache memory is limited. Cache memory performance can be improved by reducing the data transfer traffic between the system memory and the cache memory. One technique to reduce this data transfer traffic is to divide the cache lines into sectors, and then load and store only those sectors that are needed, rather than loading the entire cache line. For example, if a cache line has four sectors, then the cache controller can load one, two, or three sectors as needed, rather than the entire cache line. As a result, the cache controller does not consume memory transfer bandwidth to load sectors that are not needed by the software application.

One problem with this technique for reducing memory transfer bandwidth consumption is that utilization of the cache memory is reduced when less than full cache lines are loaded. For example, if, on average, each cache line loads data into only two of the four available sectors, then two sectors of each cache line are unused. The unused sectors on a cache line cannot be reallocated or used for another purpose without first evicting the two used sectors on that cache line. As a result, the cache memory has a utilization of 50%, leaving half of the cache memory unused and unavailable.

As the foregoing illustrates, what is needed in the art are more effective techniques for managing cache memory in a computing system.

SUMMARY

Various embodiments of the present disclosure set forth a computer-implemented method for managing cache memory in a computing system. The method includes detecting a first cache line allocation request to allocate a first logical sector. The method further includes determining that the first cache line allocation request is combinable with a second cache line allocation request to allocate a second logical sector. The method further includes storing first data associated with the first logical sector in a first physical sector of a first cache line of the cache memory. Second data associated with the second logical sector is stored in a second physical sector of the cache line.

Other embodiments include, without limitation, a system that implements one or more aspects of the disclosed techniques, and one or more computer readable media including instructions for performing one or more aspects of the disclosed techniques, as well as a method for performing one or more aspects of the disclosed techniques.

At least one technical advantage of the disclosed techniques relative to the prior art is that, with the disclosed techniques, a cache memory can share a cache line with two or more allocations, where each allocation includes fewer sectors than the entire cache line. As a result, the cache memory can have fewer unused sectors relative to prior techniques that do not employ cache line sharing. Utilization of the cache memory is thereby improved, leading to improved cache memory performance and faster execution of software applications. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
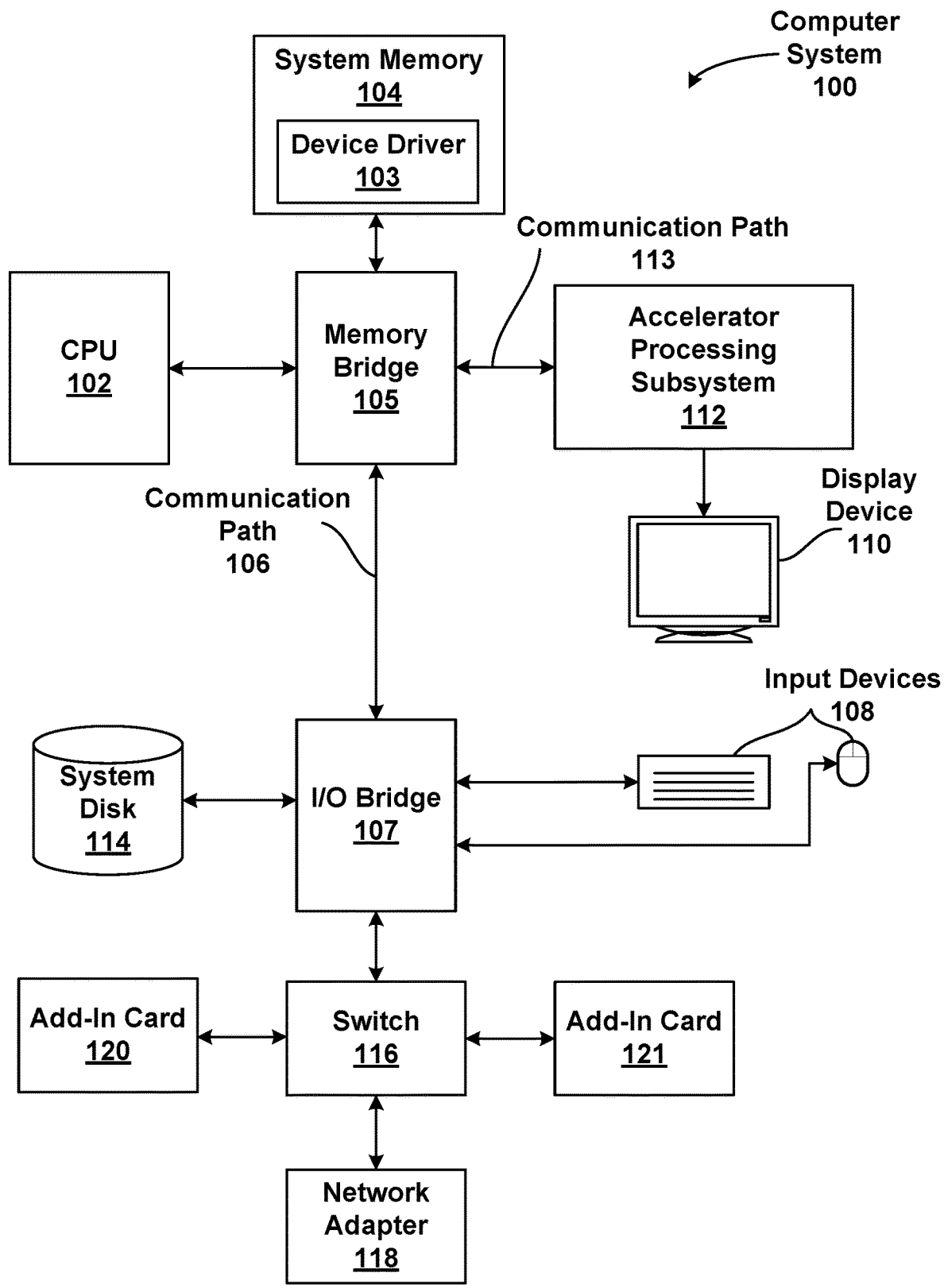
FIG. 1 is a block diagram of a computer system configured to implement one or more aspects of the various embodiments.

FIG. 1 is a block diagram of a computer system 100 configured to implement one or more aspects of the various embodiments. As shown, computer system 100 includes, without limitation, a central processing unit (CPU) 102 and a system memory 104 coupled to an accelerator processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. In some examples, input devices 108 are employed to verify the identities of one or more users in order to permit access of computer system 100 to authorized users and deny access of computer system 100 to unauthorized users. Switch 116 is configured to provide connections between I/O bridge 107 and other components of the computer system 100, such as a network adapter 118 and various add-in cards 120 and 121. In some examples, network adapter 118 serves as the primary or exclusive input device to receive input data for processing via the disclosed techniques.

As also shown, I/O bridge 107 is coupled to a system disk 114 that may be configured to store content and applications and data for use by CPU 102 and accelerator processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, Peripheral Component Interconnect Express (PCIe), HyperTransport, or any other bus or point-to-point communication protocol known in the art.

In some embodiments, accelerator processing subsystem 112 comprises a graphics subsystem that delivers pixels to a display device 110 that may be any conventional cathode ray tube, liquid crystal display, light-emitting diode display, or the like. In such embodiments, the accelerator processing subsystem 112 incorporates circuitry optimized for graphics and video processing, including, for example, video output circuitry. As described in greater detail below in FIG. 2, such circuitry may be incorporated across one or more accelerators included within accelerator processing subsystem 112. An accelerator includes any one or more processing units that can execute instructions such as a central processing unit (CPU), a parallel processing unit (PPU) of FIGS. 2-4, a graphics processing unit (GPU), an intelligence processing unit (IPU), neural processing unit (NAU), tensor processing unit (TPU), neural network processor (NNP), a data processing unit (DPU), a vision processing unit (VPU), an application specific integrated circuit (ASIC), a field-programmable gate array (FPGA), and/or the like.

In some embodiments, accelerator processing subsystem 112 includes two processors, referred to herein as a primary processor (normally a CPU) and a secondary processor. Typically, the primary processor is a CPU and the secondary processor is a GPU. Additionally or alternatively, each of the primary processor and the secondary processor may be any one or more of the types of accelerators disclosed herein, in any technically feasible combination. The secondary processor receives secure commands from the primary processor via a communication path that is not secured. The secondary processor accesses a memory and/or other storage system, such as such as system memory 104, Compute eXpress Link (CXL) memory expanders, memory managed disk storage, on-chip memory, and/or the like. The secondary processor accesses this memory and/or other storage system across an insecure connection. The primary processor and the secondary processor may communicate with one another via a GPU-to-GPU communications channel, such as Nvidia Link (NVLink). Further, the primary processor and the secondary processor may communicate with one another via network adapter 118. In general, the distinction between an insecure communication path and a secure communication path is application dependent. A particular application program generally considers communications within a die or package to be secure. Communications of unencrypted data over a standard communications channel, such as PCIe, are considered to be unsecure.

In some embodiments, the accelerator processing subsystem 112 incorporates circuitry optimized for general purpose and/or compute processing. Again, such circuitry may be incorporated across one or more accelerators included within accelerator processing subsystem 112 that are configured to perform such general purpose and/or compute operations. In yet other embodiments, the one or more accelerators included within accelerator processing subsystem 112 may be configured to perform graphics processing, general purpose processing, and compute processing operations. System memory 104 includes at least one device driver 103 configured to manage the processing operations of the one or more accelerators within accelerator processing subsystem 112.

In various embodiments, accelerator processing subsystem 112 may be integrated with one or more other the other elements of FIG. 1 to form a single system. For example, accelerator processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of accelerator processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, accelerator processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
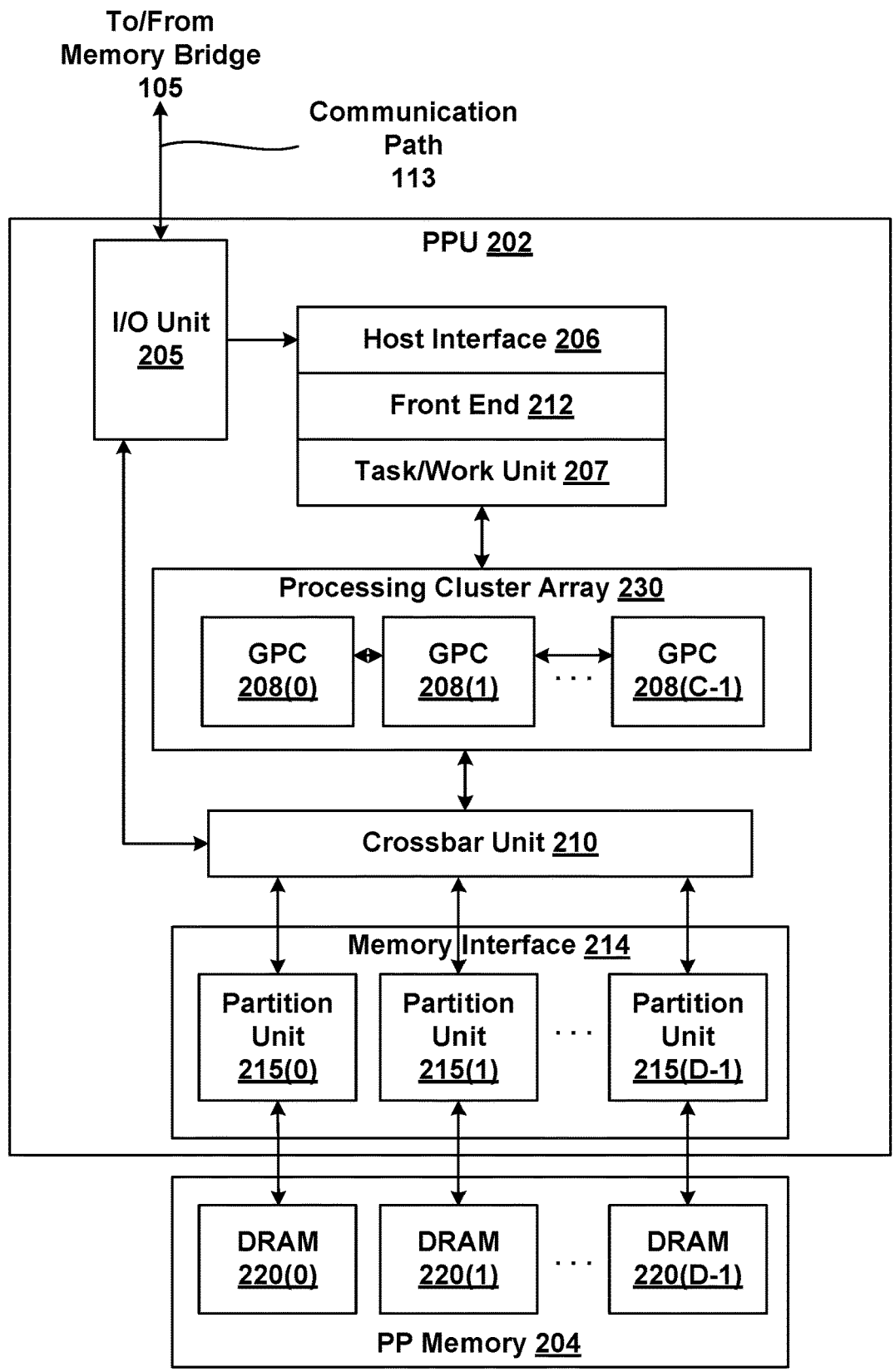
FIG. 2 is a block diagram of a parallel processing unit (PPU) included in the accelerator processing subsystem of FIG. 1, according to various embodiments.

FIG. 2 is a block diagram of a parallel processing unit (PPU) 202 included in the accelerator processing subsystem 112 of FIG. 1, according to various embodiments. Although FIG. 2 depicts one PPU 202, as indicated above, accelerator processing subsystem 112 may include any number of PPUs 202. Further, the PPU 202 of FIG. 2 is one example of an accelerator included in accelerator processing system 112 of FIG. 1. Alternative accelerators include, without limitation, CPUs, GPUs, IPUs, NPUs, TPUs, NNPs, DPUs, VPUs, ASICs, FPGAs, and/or the like. The techniques disclosed in FIGS. 2-4 with respect to PPU 202 apply equally to any type of accelerator(s) included within accelerator processing subsystem 112, in any combination. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. Additionally or alternatively, processors and/or accelerators other than CPU 102 may write one or more streams of commands for PPU 202 to a data structure. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, accelerator processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PP memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within accelerator processing subsystem 112, or another accelerator processing subsystem 112 within computer system 100.

As noted above, any number of PPUs 202 may be included in an accelerator processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
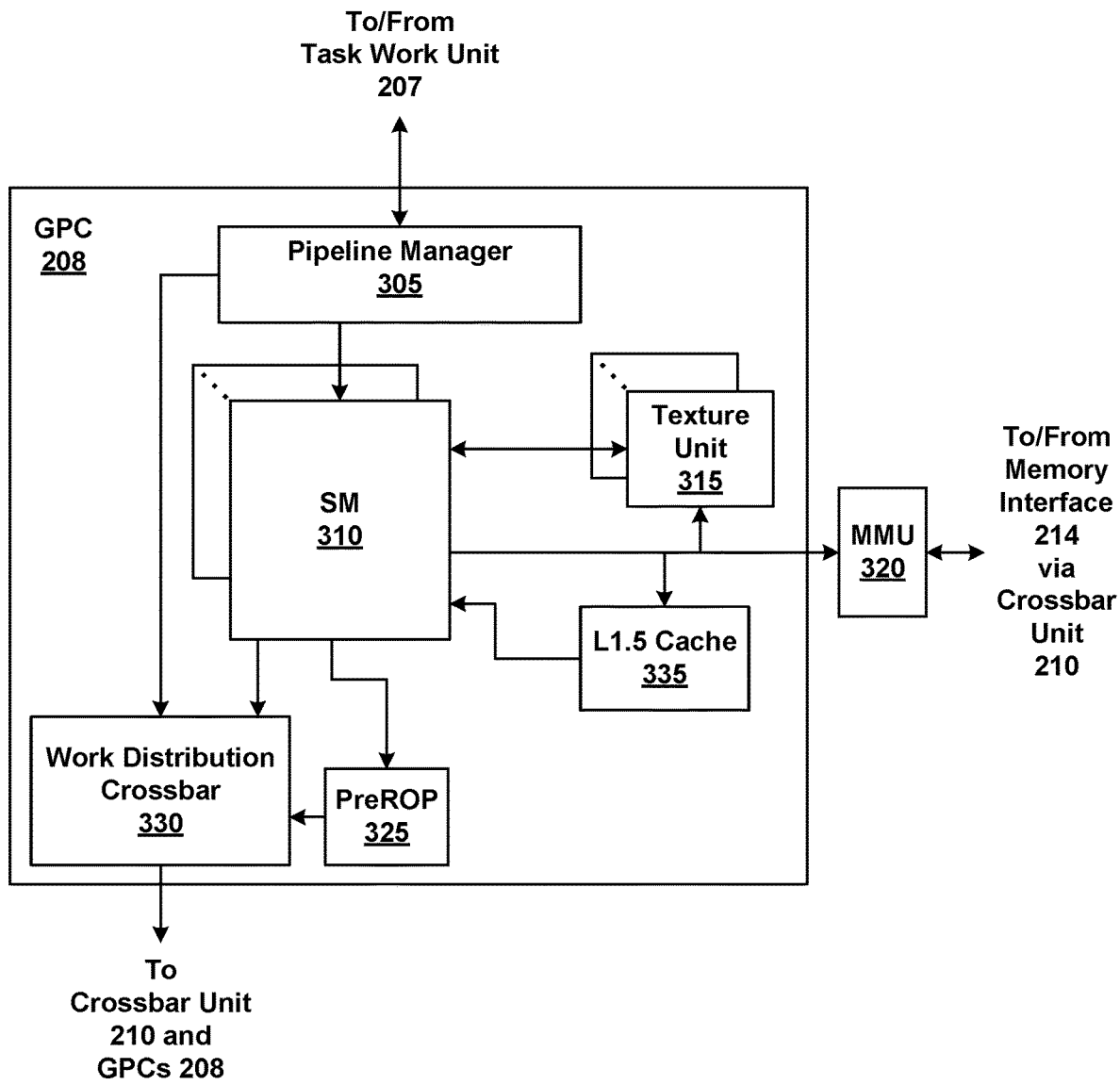
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In various embodiments, a software application written in the compute unified device architecture (CUDA) programming language describes the behavior and operation of threads executing on GPC 208, including any of the above-described behaviors and operations. A given processing task may be specified in a CUDA program such that the SM 310 may be configured to perform and/or manage general-purpose compute operations.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the various embodiments of the present disclosure.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Cache Line Sharing Among Multiple Allocations in a Sectored Cache Memory

Various embodiments include techniques for managing cache memory in a computing system that includes a sectored cache memory. Prior to the disclosed approach, the cache controller would allocate entire cache lines and then load and store only those sectors that are needed, rather than the entire cache line. As a result, with these prior techniques, the cache controller did not consume memory transfer bandwidth to load sectors that are not needed by the software application. However, these techniques lead to reduced utilization of the cache memory is when less than full cache lines are loaded. As a result, the cache memory can have a low utilization rate, which can lead to substantial portions of the cache memory being unused and unavailable. In general, prior techniques for managing memory transfer bandwidth versus cache memory utilization involve determining an optimal cache line size.

By contrast, the disclosed techniques a different approach for improving cache memory utilization without unduly increasing memory transfer bandwidth consumption. The disclosed techniques include a sectored cache memory that provides a mechanism for software applications to share portions of a cache line among two or more separate allocations. A first allocation can allocate one or more sectors of an empty and available cache line. If the first allocation results in one or more unused sectors, then a second allocation can allocate one or more of the unused sectors in the cache line. If the second allocation also results in one or more unused sectors, then additional allocations can allocate one or more of the unused sectors in the cache line. Further, if two allocations to the same cache line have overlapping logical sectors, the sectors of one of the allocations can be moved, such as via a rotation function, to eliminate the overlap, prior to loading the sectors into physical cache memory. In this manner, multiple allocations can share the same cache line in the cache memory.

Figure 4:
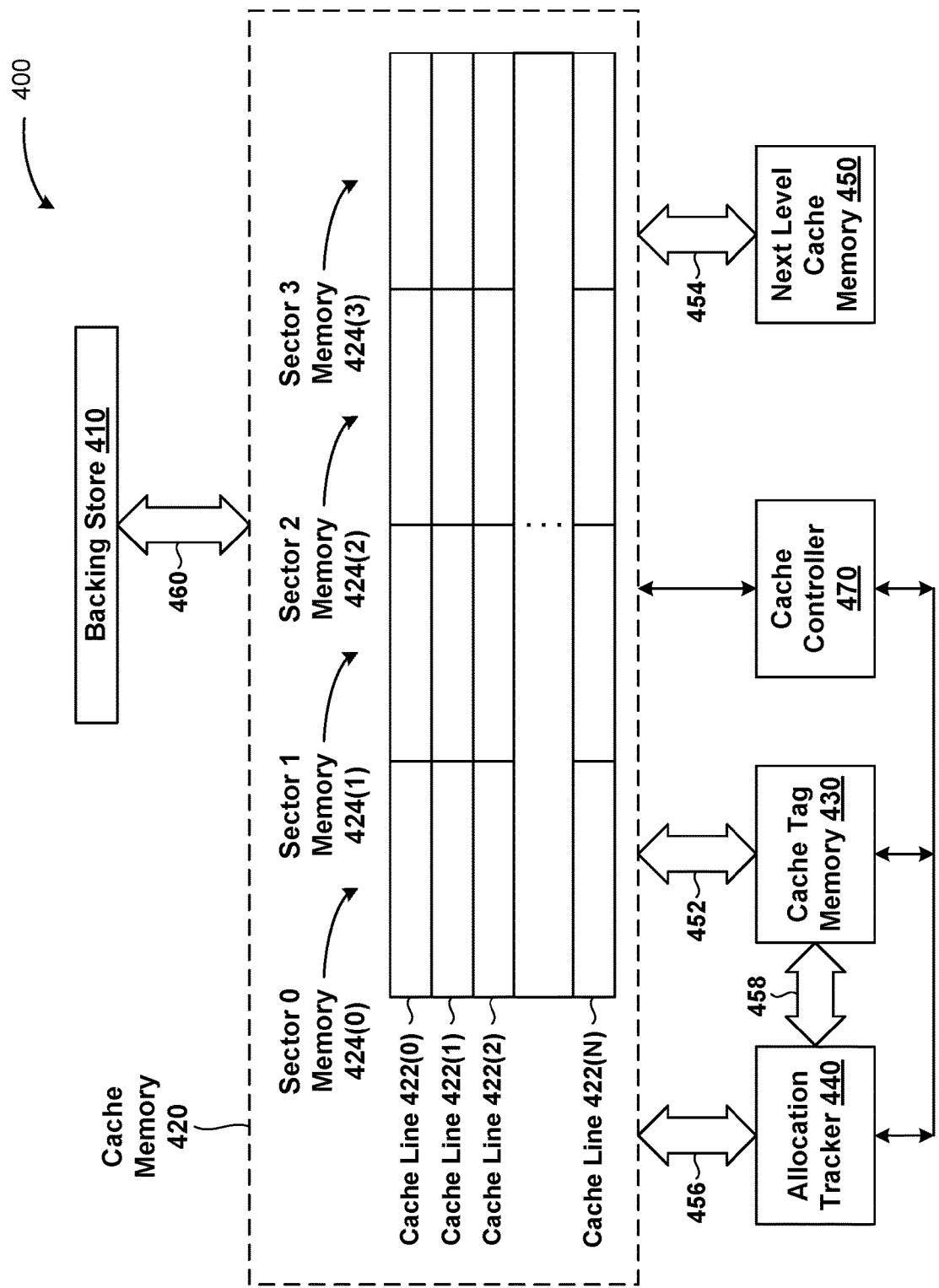
FIG. 4 is a block diagram of a cache memory system included in the CPU of FIG. 1 and/or the PPU of FIG. 2, according to various embodiments.

FIG. 4 is a block diagram of a cache memory system 400 included in the CPU 102 of FIG. 1 and/or the PPU 202 of FIG. 2, according to various embodiments. As shown, the cache memory system 400 includes, without limitation, a backing store 410, a cache memory 420, a cache tag memory 430, an allocation tracker 440, and a next level cache memory 450. The cache memory 420 can include any one or more technically feasible memories described herein, including, without limitation, an L1 cache, an L1.5 cache, or an L2 cache. The cache memory 420 maintains cache lines 422 that are loaded from a backing store 410.

The backing store 410 can include any one or more technically feasible memories described herein, including, without limitation, system memory 104 or PP memory 204. Additionally or alternatively, the backing store 410 can include a cache memory further from the CPU 102 and/or the PPU 202 relative to the cache memory 420. In some examples, the cache memory 420 can be an L2 cache and the backing store 410 can be system memory 104 or PP memory 204. The cache memory 420 can be an L1.5 cache and the backing store 410 can be an L2 cache. The cache memory 420 can be an L1 cache and the backing store 410 can be an L1.5 cache, and so on.

Unless the cache memory 420 is the cache memory closest to the CPU 102 and/or the PPU 202, the next level cache memory 450 includes a cache memory closer to the CPU 102 and/or the PPU 202 relative to the cache memory 420. In some examples, the cache memory 420 can be an L2 cache and the next level cache memory 450 can be an L1.5 cache. The cache memory 420 can be an L1.5 cache and the next level cache memory 450 can be an L1 cache, and so on.

In operation, a cache controller 470 manages the cache memory 420. The cache controller 470 loads cache lines 422, or portions thereof, of the cache memory 420 with data loaded from the backing store 410 at the time of use or just prior to the time of use by the processing unit. In total, the cache memory 420 includes N+1 cache lines 422, numbered cache line 422(0), cache line 422(1), cache line 422(2), . . . , cache line 422(N). Each cache line 422 includes four sectors, stored respectively in sector 0 memory 424(0), sector 1 memory 424(1), sector 2 memory 424(2), and sector 3 memory 424(3). When loading a cache line 422, the cache controller 470 can load a single sector memory 424 of a cache line or can load 2, 3, or all 4 sector memories of the cache line 422.

In some examples, each cache line includes 128-bytes and cache line includes four sectors, resulting in 128-bytes per cache line divided by four sectors per cache line equaling 32-bytes per sector. The communications channel 460 between the backing store 410 and the cache memory 420 can have the same data width as a sector, namely, 32 bytes.

To load one or more sector memories 424 in a cache line 422, the cache controller 470 begins with a virtual address within the virtual address space of a software application. The cache controller 470 divides the virtual address into portions, including a cache line tag, a sector number, and a sector offset. The sector number and the sector offset, taken together, form a cache line offset. For a cache memory 420 with cache lines 422 of 128 bytes (or 27 bytes), the cache line offset is the seven least significant bits (LSBs) of the virtual address. Correspondingly, the cache line tag is the portion of the virtual address other than the seven LSBs. For a cache memory 420 with cache lines 422 consisting of four (or 22) sectors, the two most significant bits (MSBs) of the cache line offset is the sector number. Further, because each sector includes 32 bytes (or 25 bytes), the sector offset is the five LSBs of the cache line offset.

The memory management unit translates the cache line tag portion of the virtual address into a physical address that addresses the beginning of the corresponding 128 bytes in the backing store 410. If the entire cache line 422 is being loaded, the cache controller 470 generates four load transactions over the communications channel 460 to retrieve four sectors of 32-bytes each and stores the four sectors in the four sector memories 424 of the cache line 422. If a single sector of the cache line 422 is being loaded, the cache controller 470 combines the physical address that addresses the beginning of the 128 bytes in the backing store 410 with the 2-bit sector number to identify the beginning of address of the sector in the backing store 410. The cache controller 470 generates a single load transaction over the communications channel 460 to retrieve the 32-byte sector and stores the sector in the corresponding sector memory 424 of the cache line 422. In a similar manner, the cache controller 470 can load two or three sectors of a cache line by generating two 32-byte load transactions or three 32-byte load transactions, respectively. The cache controller 470 stores the cache line tag in the cache tag memory 430, along with per-sector status indicators. Each sector is associated with at least two status indicators, a valid indicator and a dirty indicator.

Taken together, the valid indicator and the dirty indicator indicate one of three potential status conditions of the corresponding sector. First, if the valid indicator indicates that the sector is not valid, then the cache controller 470 cannot rely on any data stored in the corresponding sector memory 424, regardless of the state of the dirty indicator. Second, if the valid indicator indicates that the sector is valid and the dirty indicator indicates that the sector is clean (that is, not dirty), then the corresponding sector memory 424 of the cache line 422 contains valid data. Further, the data is clean, indicating that the processing unit has not written new data to the sector memory that has not yet been written to the backing store 410. Therefore, the data in the sector memory 424 is unchanged since the data was last retrieved from the backing store 410. Third, if the valid indicator indicates that the sector is valid and the dirty indicator indicates that the sector is dirty, then the corresponding sector memory 424 of the cache line 422 contains valid data, but the data in the sector memory includes new data that has not yet been written to the backing store 410. Therefore, the data in the sector memory 424 does not match the corresponding data in the backing store 410. At some future time, the cache controller 470 writes valid, dirty sectors from the cache memory 420 to the backing store 410 so that the data in the backing store 410 matches the data in the sector memory 424. Until the writeback occurs, processing units access the sector memory 424 of the cache line 422 to ensure that the processing units access the updated version of the data.

When the processing unit subsequently accesses data included in one or more valid sectors, the memory management accesses the cache line tag in the cache tag memory 430 to access the corresponding sector memory 424 of the cache line 422 via the communications channel 452. Similarly, the next level cache memory 450 can load entire cache lines or sectors thereof by generating load transactions over the communications channel 454 to load data from the cache memory 420 into the next level cache memory 450.

In some examples, the cache controller 470 allocates a cache line 422 without storing a tag in the cache tag memory 430, referred to herein as a transient allocation and/or a transient cache line allocation. Transient allocations can be useful in various use cases where the software application accesses the sectors in the allocation only once, such as with streaming applications, and/or the like. With a transient allocation, the memory management does not store a tag in the cache tag memory 430. However, the memory management does store status indicators in the cache tag memory 430 for the transient cache line 422.

To load one or more sector memories 424 in a cache line 422, the cache controller 470 begins with a virtual address within the virtual address space of a software application. The cache controller 470 divides the virtual address into portions, including a cache line tag, a sector number, and a sector offset. The sector number and the sector offset, taken together, form a cache line offset. For a transient cache line 422, the software application accesses the sectors of the transient cache line 422 directly.

The allocation tracker 440 monitors recent partial cache line allocations that are eligible for cache line sharing, as described herein. In so doing, the allocation tracker 440 monitors the cache memory 420 via the communications channel 456 and monitors the cache tag memory 430 via the communications channel 458. One type of partial cache line allocation that is eligible for cache line sharing is a transient allocation. Additionally or alternatively, a partial cache line allocation can be eligible for cache line sharing if mechanisms exist to cope with potential conflicts in any potential subsequent sector allocations within that same line. For example, the cache controller 470 could choose to allocate a new cache line 422 when inter-cache-line conflicts for sectors develop over time within a single shared cache line 422.

More generally, cache line sharing is enabled when the cache controller 470 makes a one-time choice, at allocation time, regarding which sectors are used by a given allocation. Traditional sectored caches allow that choice to be revisited, over time, to expand partial cache line allocations, sector by sector, until the partial cache line allocations are full cache line allocations. However, in order to enable cache line sharing, the cache controller 470 makes a one-time allocation that is not subject to expansion. Additionally or alternatively, the cache controller 470 uses a subset of allocations that typically involve making single allocations, such as transient cache line allocations.

The allocation tracker 440 stores the last N partial cache line allocations that are eligible for cache line sharing. When N=1, the allocation tracker 440 stores the last eligible partial cache line allocations. When N=2, the allocation tracker 440 stores the last two eligible partial cache line allocations, and so on. When the cache controller 470 receives a request for a new eligible partial cache line allocation, the cache controller 470 determines whether the new eligible partial cache line allocation can be combined with any of the eligible partial cache line allocations stored in the allocation tracker 440. If the new eligible partial cache line allocation can be combined with at least one of the eligible partial cache line allocations stored in the allocation tracker 440, then the cache controller 470 stores a cache tag in the cache tag memory 430 such that the new eligible partial cache line allocation points to the same cache line 422 in the cache memory 420 that is being combined with the new eligible partial cache line allocation.

If the new eligible partial cache line allocation cannot be combined with at least one of the eligible partial cache line allocations stored in the allocation tracker 440, then the cache controller 470 stores a cache tag in the cache tag memory 430 such that the new eligible partial cache line allocation points to an unused cache line 422 in the cache memory 420. The cache controller 470 stores a copy of the new eligible partial cache line allocation in the allocation tracker 440. If the allocation tracker 440 is full, then the cache controller 470 evicts the oldest eligible partial cache line allocation in the allocation tracker 440 prior to storing the new eligible partial cache line allocation.

Figure 5:
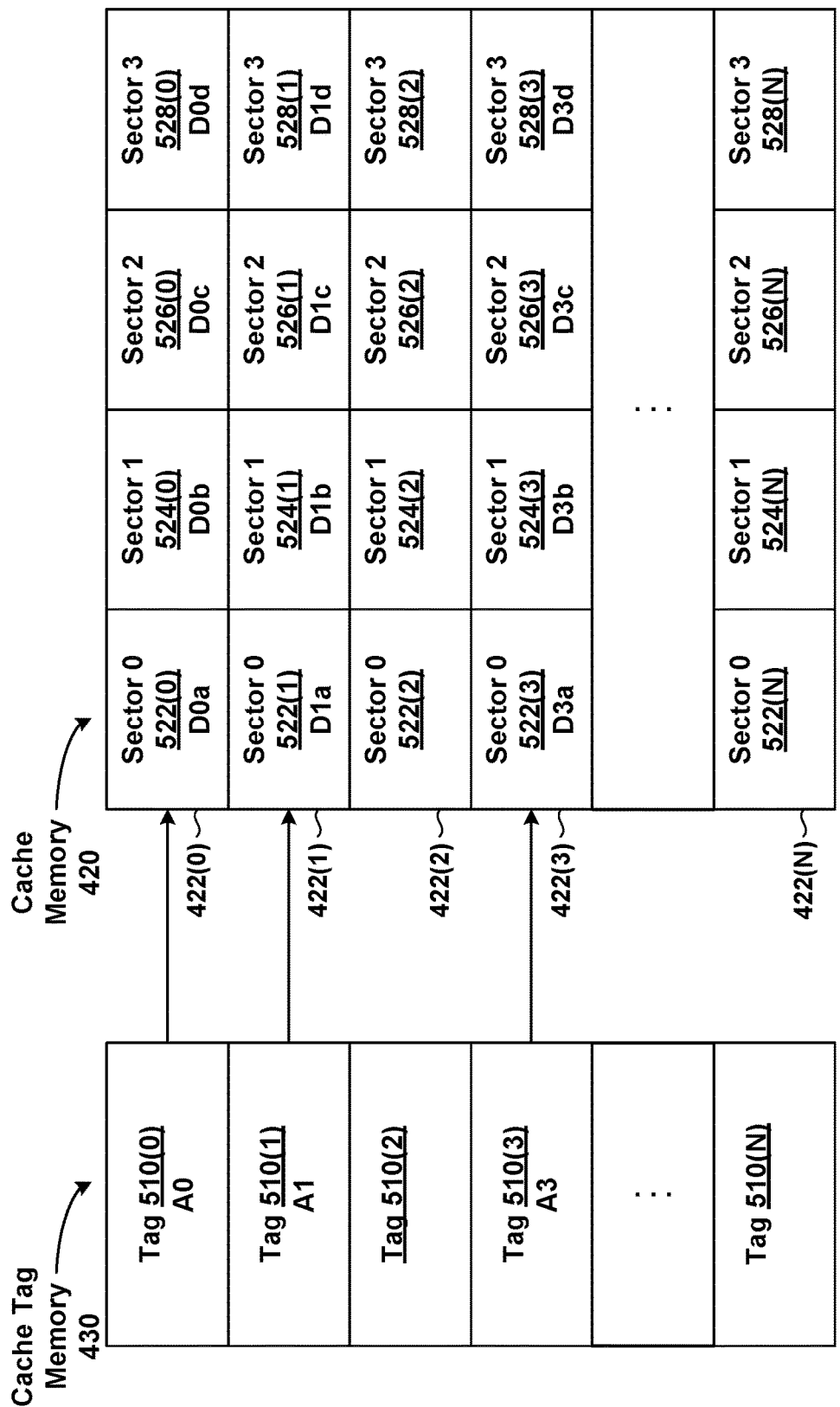
FIG. 5 is a block diagram of the cache memory and cache tag memory of FIG. 4 with one-to-one cache line mapping, according to various embodiments.

FIG. 5 is a block diagram of the cache memory 420 and cache tag memory 430 of FIG. 4 with one-to-one cache line mapping, according to various embodiments. As shown, the cache memory 420 includes, without limitation, a set of cache lines 422, where each cache line 422 is divided into multiple sectors. A first cache line 422(0) is divided into four sectors, labeled sector 0 522(0), sector 1 524(0), sector 2 526(0), and sector 3 528(0). A second cache line 422(1) is likewise divided into four sectors, labeled sector 0 522(1), sector 1 524(1), sector 2 526(1), and sector 3 528(1). A third cache line 422(2) is divided into four sectors, labeled sector 0 522(2), sector 1 524(2), sector 2 526(2), and sector 3 528(2), and so on. In total, the cache memory 420 includes N+1 cache lines, were the last cache line 422(N) is divided into four sectors, labeled sector 0 522(N), sector 1 524(N), sector 2 526(N), and sector 3 528(N).

The cache tag memory 430 includes, without limitation, the cache tag memory 430 includes N+1 cache line tags 510, numbered cache line tag 510(0), cache line tag 510(1), cache line tag 510(2), . . . , cache line tag 510(N). The cache line tags 510 have a one-to-one correspondence to the cache lines 422 in the cache memory 420. In such examples, cache line tag 510(0) corresponds to cache line 422(0), cache line tag 510(1) corresponds to cache line 422(1), cache line tag 510(2) corresponds to cache line 422(2), and so on.

As shown, three cache lines 422(0), 422(1), and 422(3) are populated with cache data. Therefore, cache line tag 510(0) with tag address A0 points to the corresponding cache line 422(0). Cache line tag 510(1) with tag address A1 points to the corresponding cache line 422(1). Cache line tag 510(3) with tag address A3 points to the corresponding cache line 422(3).

All sectors in cache lines 422(0), 422(1), and 422(3) are populated with cache data. In that regard, sector 0 522(0), sector 1 524(0), sector 2 526(0), and sector 3 528(0) are populated with cache data D0a, D0b, D0c, and D0d, respectively. Sector 0 522(1), sector 1 524(1), sector 2 526(1), and sector 3 528(1) are populated with cache data D1a, D1b, D1c, and D1d, respectively. Sector 0 522(3), sector 1 524(3), sector 2 526(3), and sector 3 528(3) are populated with cache data D3a, D3b, D3c, and D3d, respectively. The sectors of two cache lines 422(2) and 422(N) are not populated with cache data. Therefore, cache line tags 510(2) and 510(N) do not point to the corresponding cache lines 422(2) and 422(N).

In some examples, the valid status indicators for the sectors of a cache line can be combined into a binary valid sector mask that indicates which sectors of the cache line are valid. The valid sector mask can be ordered from sector 0 on the left through sector 3 on the right. Further, the valid status indicators can be set to 1 when the sector is valid and set to 0 when the sector is not valid. In such examples, the valid sector mask for cache lines 422(0), 422(1), and 422(3) are set to 0b1111, indicating that all four sectors are valid. The valid sector mask for cache lines 422(2) and 422(N) are set to 0b0000, indicating that all four sectors are not valid.

Figure 6:
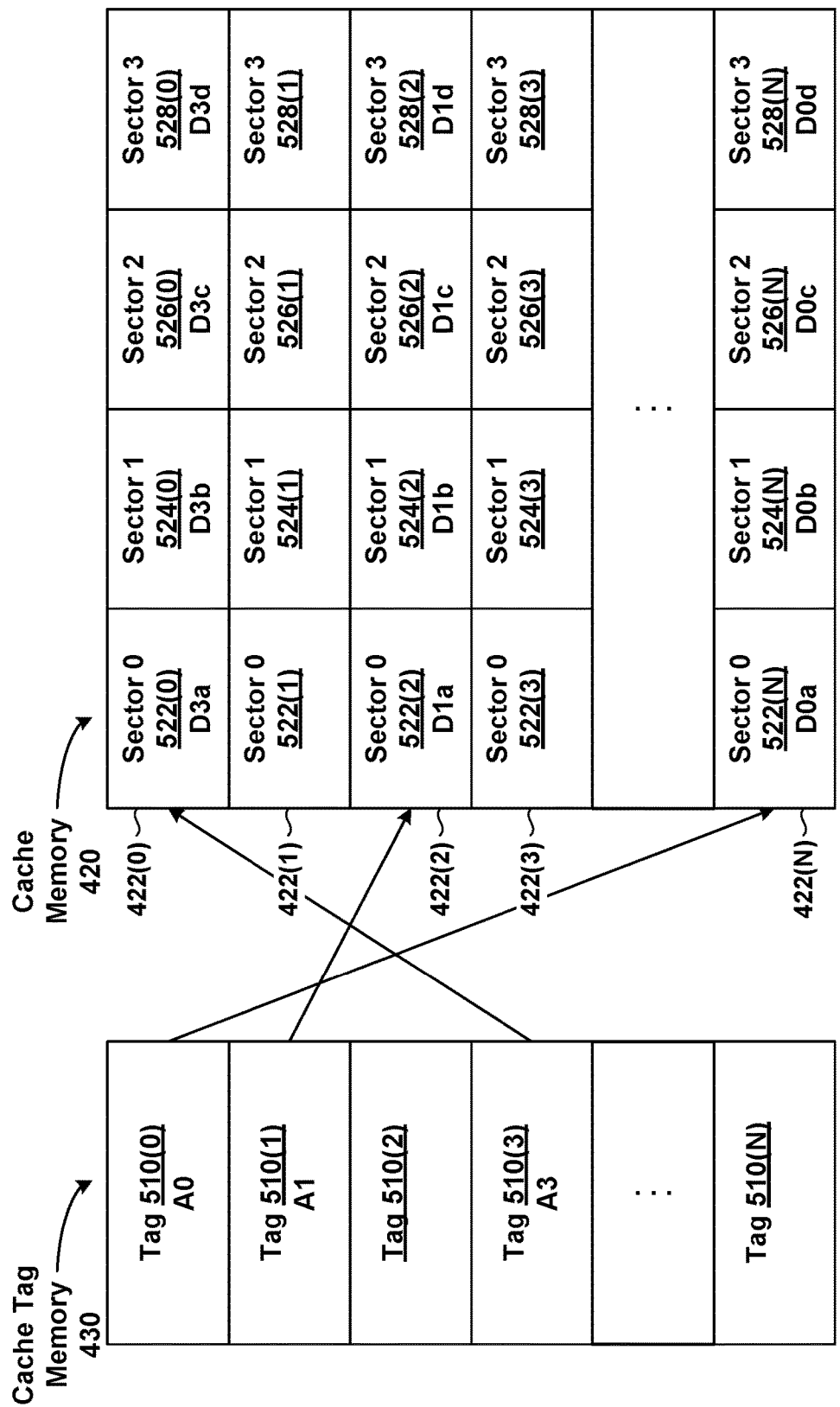
FIG. 6 is a block diagram of the cache memory and cache tag memory of FIG. 4 with flexible cache line mapping, according to various embodiments.

FIG. 6 is a block diagram of the cache memory 420 and cache tag memory 430 of FIG. 4 with flexible cache line mapping, according to various embodiments. As shown, the cache line tags 510 do not have a one-to-one correspondence to the cache lines 422 in the cache memory 420. Therefore, each cache line tag 510 can correspond to any cache line 422 in the cache memory 420. Each cache line tag 510 is associated with a cache line address (not shown in FIG. 6) that identifies the cache line 422 associated with the respective cache line tag 510.

As shown, three cache lines 422(0), 422(2), and 422(N) are partially populated with cache data. Cache line tag 510(0) with tag address A0 includes a cache line address that points to cache line 422(N). Cache line tag 510(1) with tag address A1 includes a cache line address that points to cache line 422(2). Cache line tag 510(3) with tag address A3 includes a cache line address that points to cache line 422(0).

Figure 7:
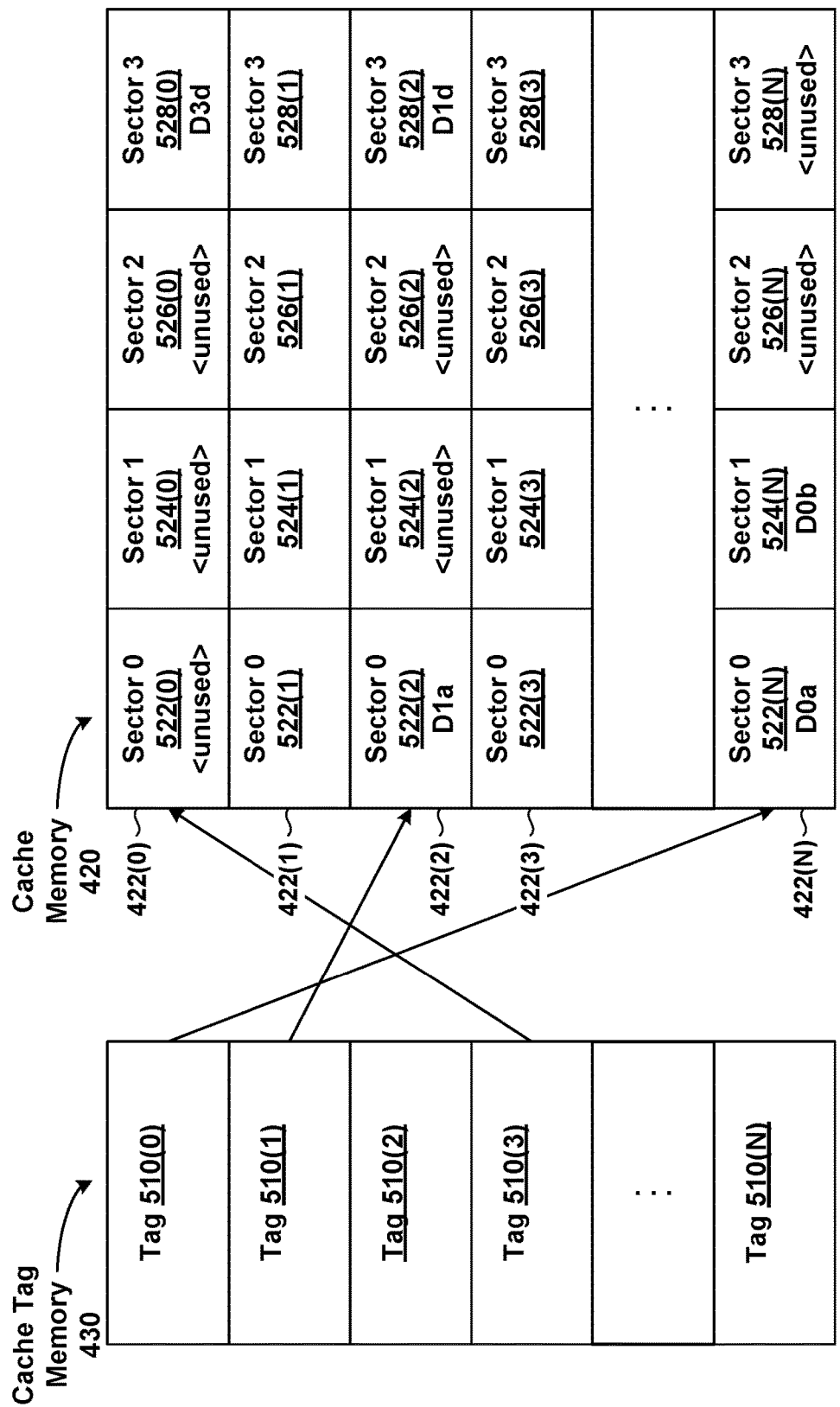
FIG. 7 is a block diagram of the cache memory and cache tag memory of FIG. 4 with unused sectors, according to various embodiments.

FIG. 7 is a block diagram of the cache memory 420 and cache tag memory 430 of FIG. 4 with unused sectors, according to various embodiments. As shown, the cache line tags 510 do not have a one-to-one correspondence to the cache lines 422 in the cache memory 420. Further, three cache line tags 510(0), 510(1), and 510(3) represent transient cache line allocations. These transient cache line tags 510(0), 510(1), and 510(3) include cache line address that point to corresponding cache lines 422 in the cache memory 420 but do not include tag addresses. More specifically, cache line tag 510(0) does not have a tag address but does include a cache line address that points to cache line 422(N). Cache line tag 510(1) does not have a tag address but does include a cache line address that points to cache line 422(2). Cache line tag 510(3) does not have a tag address but does include a cache line address that points to cache line 422(0).

Cache line 422(0) has one valid sector, sector 3 528(0), that includes data D3$d$. The remaining sectors, sector 0 522(0), sector 1 524(0), sector 2 526(0), are not valid and, therefore, do include valid data. As a result, the valid sector mask for cache line 422(0) is 0b0001. Cache line 422(2) has two valid sectors, sector 0 522(2) and sector 3 528(2), that include data D1$a$ and D1$d$, respectively. The remaining sectors, sector 1 524(2) and sector 2 526(2), are not valid and, therefore, do include valid data. As a result, the valid sector mask for cache line 422(2) is 0b1001. Cache line 422(N) likewise has two valid sectors, sector 0 522(N) and sector 1 524(N), that include data D0$a$ and D0$b$, respectively. The remaining sectors, sector 2 526(N) and sector 3 528(N), are not valid and, therefore, do include valid data. As a result, the valid sector mask for cache line 422(2) is 0b1100. Because cache line tags 510(0), 510(1), and 510(3) represent transient cache line allocations, these transient cache line allocations can be combined to share one or more cache lines 422.

Figure 8:
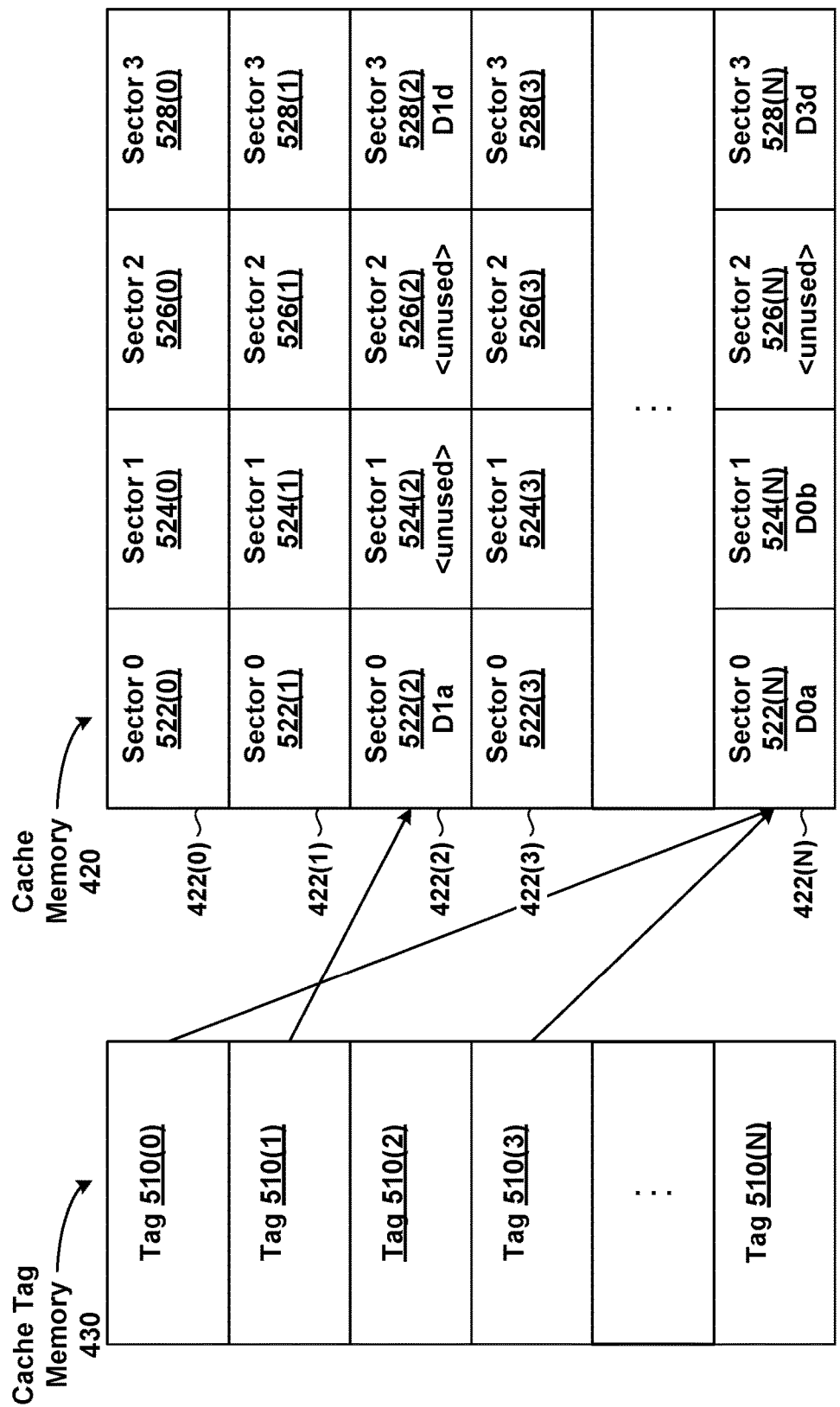
FIG. 8 is a block diagram of the cache memory and cache tag memory of FIG. 4 with cache line sharing, according to various embodiments.

FIG. 8 is a block diagram of the cache memory 420 and cache tag memory 430 of FIG. 4 with cache line sharing, according to various embodiments. When the cache controller 470 receives a request for a new eligible partial cache line allocation, the cache controller 470 determines whether the new eligible partial cache line allocation can be combined with any of the eligible partial cache line allocations stored in the allocation tracker 440. If the total number of sectors in the new eligible partial cache line allocation and a previous eligible partial cache line allocation do not exceed the number of sectors per cache line 422, the two allocations are candidates for cache line sharing. If the two allocations are disjoint, meaning that the two allocations do not store data in the same sector, then the two allocations can share the same cache line 422. In that regard, cache line tag 510(0) includes a cache line address that points to corresponding cache line 422(N) in the cache memory 420. Cache line tag 510(0) includes a valid mask of 0b1100, indicating that the cache line allocation stores data D0$a$ in sector 0 522(N) and data D0$b$ in sector 1 524(N). Cache line tag 510(3) includes a cache line address that also points to corresponding cache line 422(N) in the cache memory 420. Cache line tag 510(3) includes a valid mask of 0b0001, indicating that the cache line allocation stores data D3$d$ in sector 3 528(N).

Figure 9:
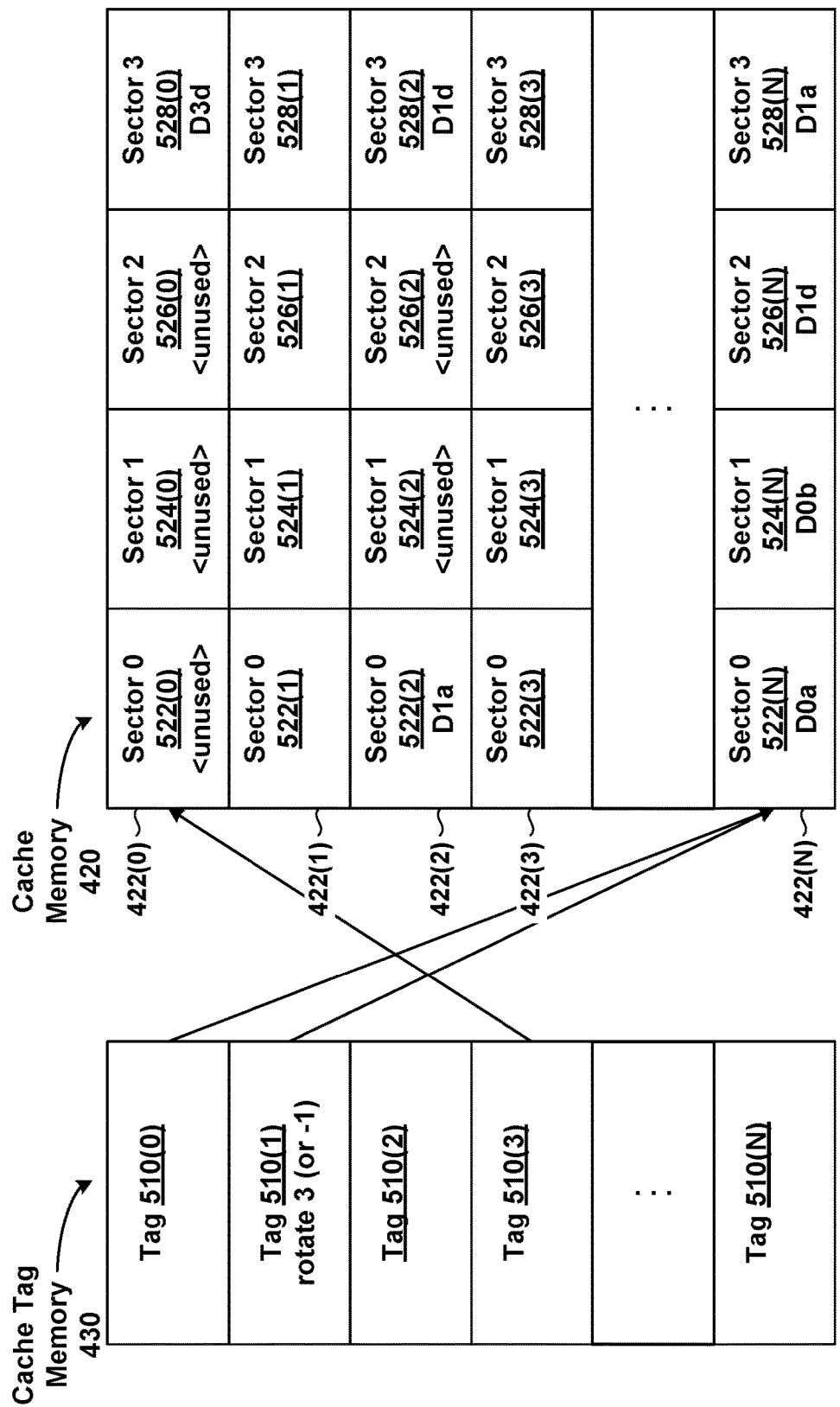
FIG. 9 is a block diagram of the cache memory and cache tag memory of FIG. 4 with cache line sharing, according to other various embodiments.

FIG. 9 is a block diagram of the cache memory 420 and cache tag memory 430 of FIG. 4 with cache line sharing, according to other various embodiments. When the cache controller 470 receives a request for a new eligible partial cache line allocation, the cache controller 470 determines whether the new eligible partial cache line allocation can be combined with any of the eligible partial cache line allocations stored in the allocation tracker 440. If the total number of sectors in the new eligible partial cache line allocation and a previous eligible partial cache line allocation do not exceed the number of sectors per cache line 422, the two allocations are candidates for cache line sharing. If the two allocations are not disjoint, the two allocations can still share a cache line if the sectors of the new eligible partial cache line allocation can be moved so as to be disjoint with the previous eligible partial cache line allocation. To distinguish between the sectors of the cache allocation request and the sectors in physical cache memory, the sectors of the cache allocation request are referred to herein as logical sectors and the sectors in physical cache memory are referred to herein as physical sectors.

One mechanism for moving the sectors of the new eligible partial cache line allocation is to rotate the sectors of the new eligible partial cache line allocation before storing the sectors in the cache line. Given a four-sector cache, the rotation value can be a two-bit rotation value that indicates the number of sector positions to rotate the sectors of the new eligible partial cache line allocation. In some examples, a rotation value of 0b00 can indicate that the new eligible partial cache line allocation is not rotated before storing the sectors in the cache line 422. A rotation value of 0b01 can indicate that the new eligible partial cache line allocation is rotated one position to the right or, equivalently, three positions to the left, before storing the sectors in the cache line 422. A rotation value of 0b10 can indicate that the new eligible partial cache line allocation is rotated two positions to the right or, equivalently, two positions to the left, before storing the sectors in the cache line 422. A rotation value of 0b11 can indicate that the new eligible partial cache line allocation is rotated three positions to the right or, equivalently, one position to the left, before storing the sectors in the cache line 422.

In that regard, cache line tag 510(0) includes a cache line address that points to corresponding cache line 422(N) in the cache memory 420. Cache line tag 510(0) includes a valid mask of 0b1100, indicating that the cache line allocation stores data D0$a$ in sector 0 522(N) and data D0$b$ in sector 1 524(N). The sectors of the cache line allocation are not rotated. Therefore, the rotation value for cache line tag 510(0) is 0b00. Cache line tag 510(1) includes a cache line address that also points to corresponding cache line 422(N) in the cache memory 420. Cache line tag 510(1) includes a valid mask of 0b1001, indicating that the cache line allocation stores data D1$a$ and D1$d$, corresponding to sectors 0 and 3, respectively, prior to rotation. The sectors of the cache line allocation are rotated three positions to the right or, equivalently, one position to the left. Therefore, the rotation value for cache line tag 510(1) is 0b11. As a result, the cache line allocation stores data D1$d$ in sector 2 526(N) and data D1$a$ in sector 3 528(N). Cache line tag 510(3) includes a cache line address that points to corresponding cache line 422(0) in the cache memory 420. Cache line tag 510(3) includes a valid mask of 0b0001, indicating that the cache line allocation stores data D3$d$ in sector 3 528(0). The sectors of the cache line allocation are not rotated. Therefore, the rotation value for cache line tag 510(3) is 0b00.

With this rotation technique, cache lines can be shared under various conditions. In some examples, up to four single-sector eligible partial cache line allocations can be combined. Two allocations of two sectors each can be combined if the two allocations allocate consecutive sectors (including the allocation of sector 0 and sector 3 as a consecutive allocation). Two allocations of two sectors each can also be combined if the two allocations allocate every other sector. A three-sector allocation can be combined with any single-sector allocation. Other combinations are possible with this rotation technique.

This rotation technique covers many useful combinations for cache line sharing but does not cover all possible combinations. Other techniques can be employed to cover additional cases not covered by rotation, within the scope of this disclosure. At the limit, complete sector-by-sector allocation can be employed to cover all possible combinations, albeit with increased complexity. Even so, the disclosed rotation technique covers most of the possible combinations with a relatively simple hardware implementation.

As described herein, cache line sharing is possible when two allocations are eligible for cache line sharing. In some examples, transient cache line allocations are eligible for cache line sharing. Transient cache line allocations can be useful for data streaming applications and other similar applications where the data is stored into the cache memory 420, read once from the cache memory 420, and then discarded. Transient cache line allocations can also be useful for applications with regular, predictable memory access patterns. Such applications use the data storage capabilities of the cache memory as a kind of scratchpad memory rather than as a general cache store. With transient cache line allocations, the cache controller 470 assembles an uncached store in a transient cache line 422 before transmitting the uncached store to the backing store 410. As a result, the cache controller 470 can use similar data paths to access transient stores and tagged stores. When the cache controller 470 uses transient cache lines 422, software applications are not able to directly observe the temporary use of such cache lines 422. In some examples, a portion of the cache memory 420 is carved out and separated from the portion of the cache memory used for tagged cache lines 422 and transient cache lines. This carve out is referred to herein as a scratchpad memory or a shared memory. The scratchpad memory is a persistent memory that a software application can request for the lifetime of a kernel. The software application can use and share the scratchpad memory as needed within the lifetime of the kernel.

In some examples, the cache tag memory 430 can include both tagged cache line tags 510 and transient cache line tags 510. In such examples, the cache controller 470 can restrict cache line sharing to allocations represented by transient cache line tags 510. By sharing cache lines, where possible, for transient cache line allocations, cache memory utilization and performance can be increased. In addition, the likelihood of evicting tagged cache allocations can be reduce, because fewer cache lines 422 are consumed by transient cache allocations.

It will be appreciated that the system shown herein is illustrative and that variations and modifications are possible. The techniques described herein are in the context of a cache memory 420 with cache lines of 128-bytes and four sector memories 424 of 32-bytes each. However, the disclosed techniques can be employed with cache lines 422 of any size, any number of sectors per cache line, and/or with sector memories 424 of any size. The techniques described herein can be applied to any one or more cache levels in a cache memory system in any combination. In that regard, the cache line size, number of sectors, and sector memory size for each cache level can be the same as one another or can be different, in any combination. The techniques described herein are in the context of a communications channel 460 between the backing store 410 and the cache memory 420 that has the same data width as a sector memory 424, namely, 32 bytes. However, the communications channel 460 between the backing store 410 and the cache memory 420 can have a data width of any size, including a data width with fewer bytes than the sector memory 424 or a data width with more bytes than the sector memory 424. The techniques described herein can be applied to any CPU 102, PPU 202, and/or any other processing unit in any combination.

In some examples, a memory system can include multiple cache memories that implement the techniques described herein. For example, an L1 cache that implements the disclosed techniques can be coupled to an L2 caches that also implements the disclosed techniques. In such cases, the L1 cache can have a cache line with a particular cache line tag and the L2 cache can also have a cache line with the same cache line tag. The cache line in the L1 cache and the cache line in the L2 cache may or may not be in the same relative position in the respective cache memories. Further, the sectors of the cache line in the L1 cache and the corresponding sectors of the cache line in the L2 cache can have the same status indicators or can have different status indicators, in any combination.

Further, cache lines in the L1 cache and cache lines in the L2 cache can have the same number of bytes and/or the same sector size or can have different a number of bytes and/or different sector sizes, in any combination. In that regard, a cache line in one cache memory can map to multiple cache lines in another cache memory, and vice versa. Further, multiple cache lines in one cache memory can store one or more of the same sectors from a given cache line in another cache memory, in any combination.

In some examples, cache line sharing can be restricted to operate with a limited set of instructions and not operate with other instructions. Restricting cache line sharing to certain instructions can simplify the implementation of the disclosed techniques in some circumstances. In some examples, cache line sharing can be implemented to function between threads within the same warp instruction. In such examples, the cache controller 470 can allow allocations to be combined only if the allocations are requested by the same warp instruction. Additionally or alternatively, cache line sharing can be implemented to function between threads across multiple warps. In such examples, the cache controller 470 can allow allocations to be combined regardless of which warp(s) requested the allocations.

In some examples, the cache memory 420 can be divided into independent tag banks, where each tag bank is managed by a different cache tag memory 430 instance. Further, each tag bank has a separate and independent allocation tracker 440. In such examples, four independent cache line sharing operations can be performed in the same clock cycle. In general, any given cache line 422 can be allocated by one tag bank at a time. In some examples, cache lines 422 are physically bound to a particular tag bank, where the cache lines 422 are divided into cache line pools, where each cache line pool is fixed to a particular tag bank. Additionally or alternatively, the tag banks can manage the same shared set of cache lines 422. Additionally or alternatively, a single allocation tracker 440 can manage multiple tag banks.

In some examples, the cache controller 470 shares cache lines in a manner that aids in reducing data bank conflicts, also referred to herein as memory data bank conflicts. A data bank conflict occurs when the cache controller 470 attempts to access the memory device multiple times in the same clock cycle. When a data bank conflict occurs, the multiple device accesses are serialized to occur over multiple clock cycles. For example, a two-way data bank conflict occurs over two clock cycles, a three-way data bank conflict occurs over three clock cycles, and so on.

In general, the cache memory 420 is implemented such each sector for a set of cache lines is stored on a different set of memory devices. Therefore, sector 0 is stored on one set of memory devices, sector 1 is stored on a second set of memory devices, sector 2 is stored on a third set of memory devices, and so on. As a result, the cache controller 470 can access two or more sectors in a single clock cycle without causing data bank conflicts. On the other hand, accessing the same sector multiple times can cause a data bank conflict. For example, if an instruction accesses sector 0 on one cache line 422 and concurrently accesses sector 0 on one or more additional cache lines 422, then the accesses can cause a data bank conflict.

As described herein, accesses to cache lines 422 associated with transient allocations are generally restricted to storing a sector to cache memory once, loading a sector from cache memory once, and then the sector can be deallocated. Further, the access pattern for sectors in a transient allocation are oftentimes regular and predictable. These access patterns can be known at design time when one or more software engineers generate the software application. Additionally or alternatively, the cache controller 470 can observe the access pattern at run time. In either case, when sharing cache lines, the cache controller 470 can assign sectors to cache lines in a manner that attempts to spread concurrent accesses across multiple sectors and to reduce the likelihood of generating multiple concurrent accesses to the same sector.

In some examples, the cache controller 470 assigns sectors in a manner that serves two, somewhat conflicting, optimization goals. A first optimization goal is to pack multiple partial cache line allocations, such as via sector rotation, in order to reduce the number of cache lines consumed or, equivalently, to increase the number of sectors used per cache line, thereby increasing cache memory utilization. A second optimization goal is to reduce the potential for data bank conflicts when the data in the cache memory 420 is accessed. In general, the amount of sector packing and the likelihood of data bank conflicts are positively correlated. As the number of sectors used per cache line increases, the likelihood of data bank conflicts also increases. Therefore, one of the optimization goals can be prioritized relative to the other optimization goal, while also balancing between these two optimization goals. In some examples, the cache controller 470 can prioritize increasing cache line utilization, with a secondary goal of reducing memory bank conflicts, for various expected and/or common access patterns.

In an example approach, the cache memory 420 can be divided into tag banks (denoted B), where each tag bank can perform a cache line allocation in the same clock cycle. Further, warps generally execute as a sequence of wavefronts (denoted N), where each wavefront executes a warp instruction for a subset of the threads in the warp. For example, a 32-thread warp can execute a warp instruction in four wavefronts, where each wavefront executes the warp instruction for a set of 8 threads. The warp instruction thereby executes in four clock cycles. In general, each wavefront accesses an amount of data that is equivalent to the amount of data stored in a full cache line. If the access pattern does not result in data bank conflicts, each wavefront can execute in a single clock cycle. Between successive wavefronts, the general goal is to share cache lines between the two wavefronts on the same tag bank.

Because each wavefront executes in a single clock cycle, data bank conflicts occur within a single wavefront. Typically, a data bank conflict occurs when a wavefront generates multiple accesses from different tag banks that access the same sector(s). Therefore, the cache controller 470 assigns sectors in a manner that attempts to avoid sector conflicts within a wavefront and from multiple tag banks, while packing sectors across multiple wavefronts within each tag bank.

In one example technique, the cache controller 470 determines if a new cache line allocation request is eligible for cache line sharing. The cache controller 470 can determine that the new cache line allocation request is eligible for cache line sharing based on whether the allocation is for a partial cache line, based on whether the allocation is from the same warp (but different wavefront) as another allocation, based on which warp instruction is executing, and/or the like. If the allocation is eligible for cache line sharing, then the cache controller 470 computes the sector number from the equation (B+N) % 4, where '%' is a modulo operation, B is the tag bank number, and N is the wavefront number.

By including the tag bank number B in the equation, the sector number is incremented for each successive tag bank. As a result, each tag bank preferentially accesses a different sector, thereby reducing the likelihood of a data bank conflict. By including the wavefront number N in the equation, the sector number increments with each successive wavefront of a warp instruction, leading to efficient sector packing within each tag bank.

The cache controller 470 assigns sectors for the cache line allocation based on the number of sectors in the allocation and the sector number computed from the equation (B+N) % 4. For cases with one sector per cache line allocation, the cache controller 470 assigns the sector (B+N) % 4 to the allocation. For cases with two sectors per cache line allocation, the cache controller 470 first determines whether the allocation is for two consecutive sectors or for every other sector.

For a consecutive two-sector allocation, the valid mask for the allocation is 0b0011, 0b0110, 0b1100, or 0b1001. If the allocation tracker 440 does not contain any previous allocations, then there is no other allocation to combine with the new allocation. The cache controller 470 assigns sector (B+N) % 4 and the immediately prior sector to the allocation. As a result, if the next allocation a one-sector allocation, then the cache controller 470 can assign the next sector to the allocation without causing a data bank conflict with the two-sector allocation.

If the allocation tracker 440 does contain a previous allocation, then the cache controller 470 assigns sector (B+N) % 4 and the immediately subsequent sector to the current allocation. If the previous allocation was a one-sector allocation, then the previous allocation likely assigned the sector prior to the current allocation. The current allocation assigns the current and subsequent sector, thereby avoiding a data bank conflict with the previous one-sector allocation. If the previous allocation was a two-sector allocation, then the previous allocation likely assigned the two sectors prior to the current allocation, as described above. The current allocation assigns the current and subsequent sector, thereby avoiding a data bank conflict with the previous two-sector allocation. If the current allocation cannot be combined with a previous allocation stored in the allocation tracker 440, then the cache controller 470 can evict one or more allocations in stored in the allocation tracker 440 and store the current allocation in the allocation tracker 440. The cache controller 470 can then proceed to the case where the allocation tracker 440 does not store any previous allocations.

For an every-other-sector two-sector allocation, the valid mask for the allocation is 0b0101 or 0b1010. The cache controller 470 assigns sector (B+N) % 4 and the second subsequent sector to the current allocation. A subsequent one-sector allocation can be assigned to the unused sector between the two sectors assigned to the current allocation. A subsequent every-other-sector two-sector allocation can be assigned to the unused sector between the two sectors and the sector subsequent to the sectors assigned to the current allocation.

For cases with three sectors per cache line allocation, the cache controller 470 assigns sectors as follows. If the allocation tracker 440 does not contain any previous allocations, then the cache controller 470 rotates the sectors of the current allocation such that the unused sector is at the sector ((B+N+1) % 4), which is the preferred sector of a subsequent one-sector allocation. If the allocation tracker 440 contains a previous one-sector allocation, then the cache controller 470 rotates the sectors of the current allocation such that the unused sector is in the same position as the sector in the previous allocation. If the allocation tracker 440 contains a previous multiple-sector allocation, then the current allocation cannot be combined with a previous allocation stored in the allocation tracker 440. The cache controller 470 can evict one or more allocations in stored in the allocation tracker 440 and store the current allocation in the allocation tracker 440. The cache controller 470 can then proceed to the case where the allocation tracker 440 does not store any previous allocations.

In some examples, other similar techniques that vary from the described technique can be implemented within the scope of the present disclosure. In some examples, the sector number computed by the formula (B+N) % 4 could instead be computed by the formula (B−N) % 4, (N−B) % 4, and/or the like. Other variants from the described technique are contemplated within the scope of the present disclosure. Further, the described techniques are in the context of a cache memory 420 that includes four sectors per cache line 422. Various additional and/or alternative techniques can be employed for a cache memory 420 with a different number of sectors per cache line 422. Even so, the general framework of (B+N) % (Number-of-Sectors) for the reference sector can be employed as a starting point for such cache memories 420.

After partial cache lines 422 are combined and stored in the cache memory 420, with and/or without rotation, data items stored in the partial cache lines 422 can be subsequently accessed. In general, a requestor accessing data items stored in the partial cache lines 422 provides the cache line index to a particular cache line 422 in the cache memory 420. In addition, the requestor provides the 2-bit rotation value in order to translate between logical sectors and physical sectors. For tagged cache lines 422 that share a cache line 422, the cache line tags 510 include the 2-bit rotation value. The cache controller 470 uses the 2-bit rotation value to rotate the access request directed to the cache line 422 in the cache memory 420. Similarly, the cache controller 470 rotates requests directed to transient cache lines 422 when the cache controller 470 performs the single read access of the data stored in the shared cache line 422. This 2-bit rotate code is an included element for accesses directed to the cache memory 420 because requesters are unaware of whether the data being accessed has been rotated or not. In some examples, the rotation value is assigned when a request is processed. The rotation value passes through the downstream memory system and is received along with the returned data. Additionally or alternatively, the rotation value can be generated, stored, and propagated via any technically feasible techniques.

Figure 10:
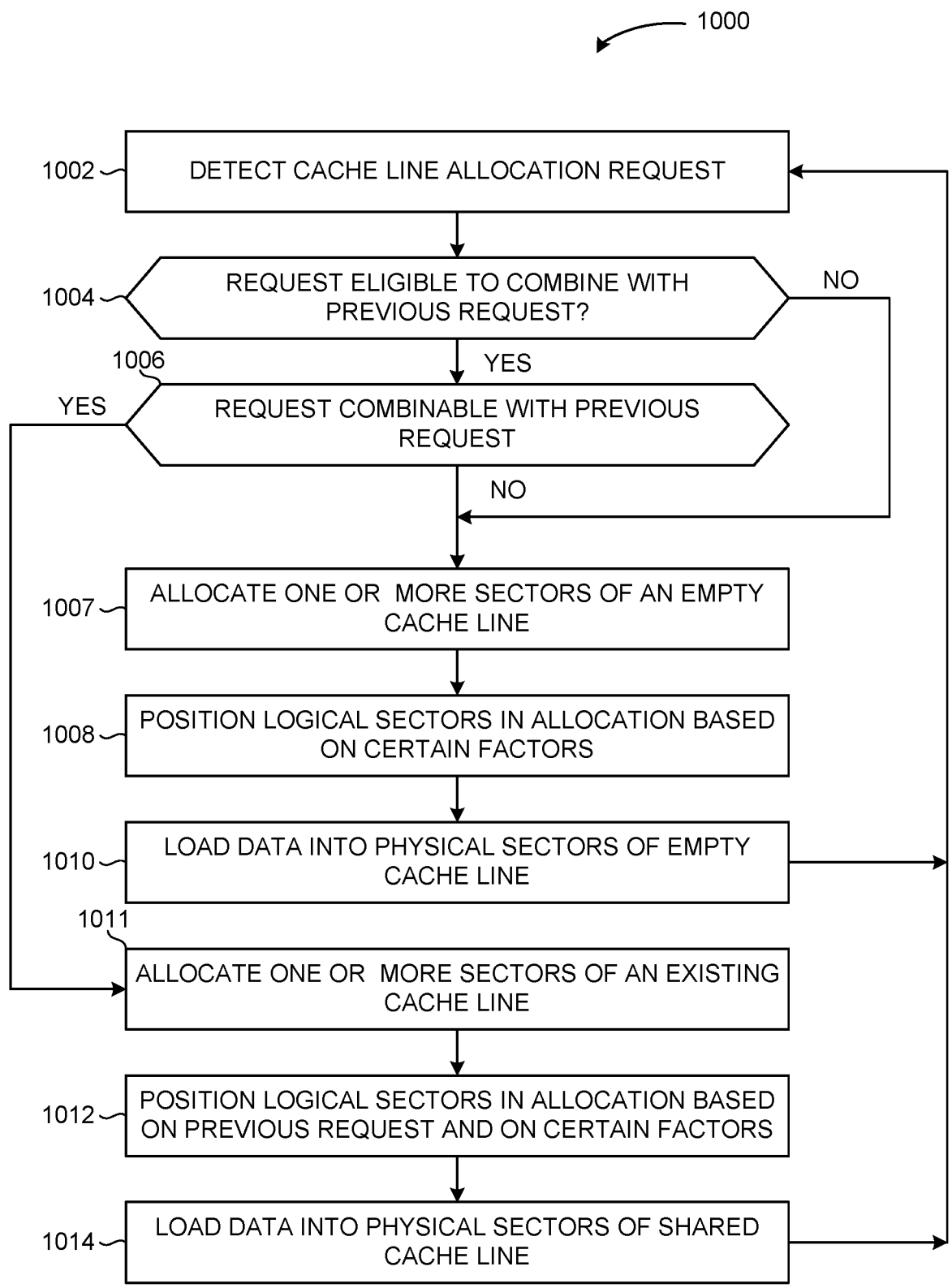
FIG. 10 is a flow diagram of method steps for managing cache memory for a processing unit, such as the CPU of FIG. 1 or the PPU of FIG. 2, according to various embodiments.

FIG. 10 is a flow diagram of method steps for managing cache memory for a processing unit, such as the CPU 102 of FIG. 1 or the PPU 202 of FIG. 2, according to various embodiments. Additionally or alternatively, the method steps can be performed by one or more alternative accelerators including, without limitation, CPUs, GPUs, IPUs, NPUs, TPUs, NNPs, DPUs, VPUs, ASICs, FPGAs, and/or the like, in any combination. Although the method steps are described in conjunction with the systems of FIGS. 1-9, persons of ordinary skill in the art will understand that any system configured to perform the method steps, in any order, is within the scope of the present disclosure.

As shown, a method 1000 begins at step 1002, where a cache controller 470 detects a cache line allocation request to allocate sectors in a cache line of a cache memory.

At step 1004, the cache controller 470 determines whether the cache line allocation is eligible for cache line sharing. One type of a partial cache line allocation that is eligible for cache line sharing is a transient allocation. Additionally or alternatively, a cache line allocation can be eligible for cache line sharing if mechanisms exist to cope with potential conflicts in any potential subsequent sector allocations within that same line. For example, the cache controller 470 could choose to allocate a new cache line 422 when inter-cache-line conflicts for sectors develop over time within a single shared cache line 422. Further, the cache line allocation is eligible for cache line sharing if the allocation allocates fewer sectors than an entire cache line.

More generally, cache line sharing is enabled when the cache controller 470 makes a one-time choice, at allocation time, regarding which sectors are used by a given allocation. Traditional sectored caches allow that choice to be revisited, over time, to expand partial cache line allocations, sector by sector, until the partial cache line allocations are full cache line allocations. However, in order to enable cache line sharing, the cache controller 470 makes a one-time allocation that is not subject to expansion. Additionally or alternatively, the cache controller 470 uses a subset of allocations that typically involve making single allocations, such as transient cache line allocations.

If the cache line allocation allocates the entire cache line, then the allocation cannot be shared with another allocation, by definition. In some examples, the cache controller 470 can determine whether the cache line allocation is eligible for cache line sharing based on certain other factors. These factors can include whether the allocation is from the same warp (but different wavefront) as another allocation, the particular warp instruction that is executing, and/or the like.

If, at step 1004, the cache line allocation is not eligible for cache line sharing, then the method 1000 proceeds to step 1008, described herein. If, however, the cache line allocation is eligible for cache line sharing, then the method 1000 proceeds to step 1006, where the cache controller 470 determines whether the cache line allocation is combinable with any previous allocations stored in the allocation tracker

440. The allocation tracker 440 monitors recent partial cache line allocations that are eligible for cache line sharing, as described herein. The allocation tracker 440 stores the last N partial cache line allocations that are eligible for cache line sharing. When N=1, the allocation tracker 440 stores the last eligible partial cache line allocation. When N=2, the allocation tracker 440 stores the last two eligible partial cache line allocations, and so on. When the cache controller 470 receives a request for a new eligible partial cache line allocation, the cache controller 470 determines whether the new eligible partial cache line allocation can be combined with any of the eligible partial cache line allocations stored in the allocation tracker 440.

If, at step 1006, the cache line allocation cannot be combined with any previous allocations stored in the allocation tracker 440, then the method 1000 proceeds to step 1008, where the cache controller 470 allocates one or more sectors of an empty cache line. With prior approaches, allocation of a cache line 422 included requesting an allocation of a cache line and, in response, receiving an index X (between 0 and N), that references cache line 422(X). By contrast, with the disclosed techniques, allocation of a cache line 422 includes requesting an allocation of a cache line and concurrently generating a sector mask for that allocation request. Further, the disclosed techniques include receiving, in response, an index X (between 0 and N), that references cache line 422(X). Further, the disclosed techniques include receiving a two-bit rotation value to use whenever referring to this allocation. At step 1010, the cache controller 470 positions the logical sectors of the cache line allocation based on certain factors. These factors can include optimization goals. A first optimization goal is to pack multiple partial cache line allocations, such as via sector rotation, in order to reduce the number of cache lines consumed or, equivalently, to increase the number of sectors used per cache line, thereby increasing cache memory utilization. A second optimization goal is to reduce the potential for data bank conflicts when the data in the cache memory 420 is accessed. In general, the amount of sector packing and the likelihood of data bank conflicts are positively correlated. As the number of sectors used per cache line increases, the likelihood of data bank conflicts also increases. Therefore, one of the optimization goals can be prioritized relative to the other optimization goal, while also balancing between these two optimization goals. In some examples, the cache controller 470 can prioritize increasing cache line utilization, with a secondary goal of reducing memory bank conflicts, for various expected and/or common access patterns. Techniques for balancing between these two optimization goals are described herein.

At step 1012, the cache controller 470 loads data into the physical sectors of the cache line allocation according to the positions of the sectors determined in step 1010. After a successful allocation, the two-bit rotation value is returned to the agent that requested the cache line 422, so that the requesting agent knows how to subsequently access the allocated cache line 422. For tagged accesses, returning the rotation value can be accomplished by storing the two-bit rotation value within the tag itself. For transient requests, returning the rotation value can be accomplished by returning the two-bit rotation value along with the allocation index X, where the allocation index X identifies the corresponding cache line 422(X). The method 1000 proceeds to step 1002, described above.

Returning to step 1006, if the cache line allocation can be combined with any previous allocations stored in the allocation tracker 440, then the method 1000 proceeds to step 1014, where the cache controller 470 allocates one or more sectors of an existing cache line, as describe in conjunction with step 1008. At step 1016, the cache controller 470 positions the logical sectors of the cache line allocation based on certain factors and on the previous allocations. The factors are described in conjunction with step 1010. In addition, the memory management positions the sectors of the current allocation such that the sectors of the current allocation align with unused sectors of a previous allocation stored in the allocation tracker 440. As a result, the current allocation and the previous allocation are disjoint and, therefore, can share the same cache line.

At step 1018, the cache controller 470 loads data into the physical sectors of the cache line allocation according to the positions of the sectors determined in step 1016. After a successful allocation, the two-bit rotation value is returned to the agent that requested the cache line 422, so that the requesting agent knows how to subsequently access the allocated cache line 422. For tagged accesses, returning the rotation value can be accomplished by storing the two-bit rotation value within the tag itself. For transient requests, returning the rotation value can be accomplished by returning the two-bit rotation value along with the allocation index X, where the allocation index X identifies the corresponding cache line 422(X). The method 1000 proceeds to step 1002, described above.

In sum, a sectored cache memory in a computing system, where the cache memory can share each cache line among multiple cache line allocations. The sectored cache memory provides a mechanism for software applications to share portions of a cache line among two or more separate allocations. A first allocation can allocate one or more sectors of an empty and available cache line. If the first allocation results in one or more unused sectors, then a second allocation can allocate one or more of the unused sectors in the cache line. If the second allocation also results in one or more unused sectors, then additional allocations can allocate one or more of the unused sectors in the cache line. Further, if two allocations to the same cache line have overlapping logical sectors, the sectors of one of the allocations can be moved, such as via a rotation function, to eliminate the overlap, prior to loading the sectors into physical cache memory. In this manner, multiple allocations can share the same cache line in the cache memory.

At least one technical advantage of the disclosed techniques relative to the prior art is that, with the disclosed techniques, a cache memory can share a cache line with two or more allocations, where each allocation includes fewer sectors than the entire cache line. As a result, the cache memory can have fewer unused sectors relative to prior techniques that do not employ cache line sharing. Utilization of the cache memory is thereby improved, leading to improved cache memory performance and faster execution of software applications. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for managing a cache memory in a computing system, the method comprising:
   detecting a first cache line allocation request to allocate a first logical sector;
   determining that the first cache line allocation request is combinable with a second cache line allocation request to allocate a second logical sector;
   storing first data associated with the first logical sector in a first physical sector of a first cache line of the cache memory; and
   storing a first cache line tag in a cache tag memory, the first cache line tag being associated with the first logical sector that references the first cache line,
   wherein second data associated with the second logical sector is stored in a second physical sector of the first cache line, and
   wherein a second cache line tag stored in the cache tag memory and associated with the second logical sector references the first cache line.

2. The computer-implemented method of claim 1, wherein determining that the first cache line allocation request is combinable with the second cache line allocation request comprises determining that the first logical sector and the second logical sector do not overlap.

3. The computer-implemented method of claim 1, wherein determining that the first cache line allocation request is combinable with the second cache line allocation request comprises:
   determining that the first logical sector and the second logical sector overlap in the first cache line; and
   determining that the first logical sector can be moved to not overlap with the second logical sector.

4. The computer-implemented method of claim 1, further comprising determining that the first cache line allocation request is a transient cache line allocation request.

5. The computer-implemented method of claim 1, wherein the first logical sector is allocated via a first tag bank associated with the cache memory, and the second logical sector is allocated via a second tag bank associated with the cache memory.

6. The computer-implemented method of claim 1, wherein:
   the first cache line allocation request and the second cache line allocation request are associated with a warp instruction that is executed as a set of wavefronts;
   the first logical sector is allocated via a first wavefront included in the set of wavefronts; and
   the second logical sector is allocated via a second wavefront included in the set of wavefronts.

7. The computer-implemented method of claim 1, further comprising concurrently accessing the first physical sector and the second physical sector does not cause a memory data bank conflict.

8. The computer-implemented method of claim 1, wherein the first cache line includes 128-bytes, and the first physical sector includes 32 bytes.

9. The computer-implemented method of claim 1, wherein the first cache line includes four physical sectors, including the first physical sector and the second physical sector.

10. The computer-implemented method of claim 1, wherein the cache memory comprises a level one (L1) cache, a level 1.5 (L1.5) cache, or a level two (L2) cache.

11. The computer-implemented method of claim 1, wherein the first cache line allocation request is issued by a software application.

12. A system comprising:
a cache memory; and
a cache controller coupled to the cache memory and configured to:
detect a first cache line allocation request to allocate a first logical sector;
determine that the first cache line allocation request is combinable with a second cache line allocation request to allocate a second logical sector;
store first data associated with the first logical sector in a first physical sector of a first cache line of the cache memory; and
store a first cache line tag in a cache tag memory, the first cache line tag being associated with the first logical sector that references the first cache line,
wherein second data associated with the second logical sector is stored in a second physical sector of the first cache line, and
wherein a second cache line tag stored in the cache tag memory and associated with the second logical sector references the first cache line.

13. The system of claim 12, wherein, to determine that the first cache line allocation request is combinable with the second cache line allocation request, the cache controller is further configured to determine that the first logical sector and the second logical sector do not overlap.

14. The system of claim 12, wherein, to determine that the first cache line allocation request is combinable with the second cache line allocation request, the cache controller is further configured to:
determine that the first logical sector and the second logical sector overlap in the first cache line; and
determine that the first logical sector can be moved to not overlap with the second logical sector.

15. The system of claim 12, wherein the cache controller is further configured to determine that the first cache line allocation request is a transient cache line allocation request.

16. The system of claim 12, wherein the first logical sector is allocated via a first tag bank associated with the cache memory, and the second logical sector is allocated via a second tag bank associated with the cache memory.

17. The system of claim 12, wherein:
the first cache line allocation request and the second cache line allocation request are associated with a warp instruction that is executed as a set of wavefronts;
the first logical sector is allocated via a first wavefront included in the set of wavefronts; and
the second logical sector is allocated via a second wavefront included in the set of wavefronts.

18. The system of claim 12, wherein the cache controller is further configured to concurrently access the first physical sector and the second physical sector does not cause a memory data bank conflict.

19. The system of claim 12, wherein the first cache line includes 128-bytes, and the first physical sector includes 32 bytes.

20. The system of claim 12, wherein the first cache line includes four physical sectors, including the first physical sector and the second physical sector.

21. The computer-implemented method of claim 1, wherein:
the first cache line allocation request is from a first thread in a thread group; and
the second cache line allocation request is from a second thread in the thread group.

* * * * *